United States Patent
Chen et al.

(10) Patent No.: US 8,520,702 B2
(45) Date of Patent: Aug. 27, 2013

(54) METHOD AND DEVICE FOR PROVIDING A SERVICE

(75) Inventors: Jian Feng Chen, Beijing (CN); Ning Liao, Beijing (CN)

(73) Assignee: Thomson Licensing (FR)

( * ) Notice: Subject to any disclaimer, the term of this patent is extended or adjusted under 35 U.S.C. 154(b) by 332 days.

(21) Appl. No.: 12/736,111

(22) PCT Filed: Jan. 20, 2009

(86) PCT No.: PCT/EP2009/050579
§ 371 (c)(1),
(2), (4) Date: Sep. 10, 2010

(87) PCT Pub. No.: WO2009/118206
PCT Pub. Date: Oct. 1, 2009

(65) Prior Publication Data
US 2011/0002265 A1    Jan. 6, 2011

(30) Foreign Application Priority Data
Mar. 27, 2008 (EP) .................................. 08300159

(51) Int. Cl.
*H04J 3/22* (2006.01)
(52) U.S. Cl.
USPC .......................................................... 370/469
(58) Field of Classification Search
USPC ................. 370/229, 235, 236, 241, 252, 351, 370/389, 431, 437, 463, 464, 465, 469
See application file for complete search history.

(56) References Cited

U.S. PATENT DOCUMENTS

| | | | |
|---|---|---|---|
| 2005/0255862 A1* | 11/2005 | Jung et al. | 455/456.2 |
| 2006/0072509 A1* | 4/2006 | Lindoff et al. | 370/332 |
| 2007/0223422 A1* | 9/2007 | Kim et al. | 370/334 |
| 2008/0013485 A1* | 1/2008 | Gorokhov et al. | 370/329 |
| 2008/0292005 A1* | 11/2008 | Xu et al. | 375/240.28 |

FOREIGN PATENT DOCUMENTS

| | | |
|---|---|---|
| EP | 1718097 | 11/2006 |
| EP | 1718097 A1 * | 11/2006 |

OTHER PUBLICATIONS

Son et al., "MBS Refinement: IEEE C802.16e-05/242rl", Internet Citation, Aug. 3, 2006.
Etemad, "Clarification and Fixes in the MBS Definitions and Procedures", Internet Citation, Jan. 14, 2008.
Shim et al., "MBS Service by Application Signaling Between MS and Network", Internet Citation, Mar. 19, 2008.
Search report dated Apr. 17, 2009.

* cited by examiner

*Primary Examiner* — Omar Ghowrwal
(74) *Attorney, Agent, or Firm* — Jack Schwartz and Associates, PLLC

(57) ABSTRACT

A method for providing a service comprising a plurality of coding layers in a communication network is provided, and wherein each one of said plurality of layers is associated with a unique identifier, the method uses a single message containing necessary information for a receiver to derive all identifiers for several layers within a single service; the method allows to reduce the messages exchange in such a communication system.

6 Claims, 6 Drawing Sheets

| PREAMBLE | DL-MAP | MBS-MAP | Session 1_BASE | Session 2_BASE | Session 1_ENHANCEMENT 1 | Session 2_ENHANCEMENT 1 | Session 1_ENHANCEMENT 2 | Session 2_ENHANCEMENT 2 |
|---|---|---|---|---|---|---|---|---|
| 201 | 203 | 205 | 207 | 209 | 211 | 213 | 215 | 217 |

Fig. 2 PRIOR ART

METHOD AND DEVICE FOR PROVIDING A SERVICE

This application claims the benefit, under 35 U.S.C. §365 of International Application PCT/EP2009/050579, filed Jan. 20, 2009, which was published in accordance with PCT Article 21(2) on Oct. 1, 2009 in English and which claims the benefit of European patent application No. 08300159.4, filed Mar. 27, 2008.

TECHNICAL FIELD

The present invention generally relates to the field of communication, and in particular, to a method for providing a service in a layered coding communication network.

BACKGROUND

The IEEE 802.16 standard specifies a fixed and mobile Broadband Wireless Access (BWA) standard for a wireless Metropolitan Area Network (MAN). The IEEE 802.16 standard defines different physical layer technologies for different frequency bands.

In current communication systems, multicast and broadcast techniques are employed for transmitting data from one source to multiple destinations. In order to effectively utilize radio resources, the IEEE 802.16e standard has introduced the Multicast and Broadcast Service (MBS) that standardizes the point to multi-point transmission in the mobile network. The MBS service may support not only the multicast and broadcast of low bit-rate message services such as text, but also the multicast and broadcast of high bit-rate multimedia services. Below is a citation from an IEEE 802.16e standard (Section 6.3.23 Multicast and broadcast services in 'IEEE Std 802.16e™-2005 and IEEE Std 802.16™-2004/Cor1-2005') with regard to the MBS: "Some globally defined service flows may carry broadcast or multicast information that should be delivered to a plurality of SS or MS. Such service flows have certain QoS parameters and may require encryption performed using a globally defined sequence of TEKs. Since a multicast or broadcast transport connection is associated with a service flow, it is associated with the QoS and traffic parameters for that service flow. Some MS are registered to certain BS while some are in Idle mode and not currently served by any specific BS. Two types of access to multicast and broadcast services (MBS) may be supported: single-BS access and multi-BS access. Single-BS access is implemented over multicast and broadcast transport connections within one BS, while multi-BS access is implemented by transmitting data from Service Flow(s) over multiple BS. MS may support both Single-BS and Multi-BS access. ARQ is not applicable to either single-BS-MBS or multi-BS-MBS. Initiation of MBS with respect to specific MS is always performed in registered state by creation of multicast connection carrying MBS data. During such initiation the MS learns the Service Flow ID that identifies the service. For multi-BS-MBS, each BS capable of providing MBS belongs to a certain MBS Zone, which is a set of BSs where the same CID and same SA is used for transmitting content of certain Service Flow(s). MBS Zone is identified by a unique MBS_ZONE identifier". It should be understood that more details about MBS can be found in the standard.

A Subscriber Station (SS) receives the MBS service through the indication in the MBS_MAP message. The MBS_MAP message provides information on physical channel resources allocated for a specific Multicast Connection Identifier (CID), i.e. an MBS service, in a given MBS ZONE. According to the 802.16 standard, the CID is defined as a 16-bit value that identifies a transport connection or an uplink/downlink pair of associated management connections to equivalent peers in the MAC of the BS and SS. The physical channel resources include occupied OFDM symbols and used Sub-channels. The MBS_MAP message also provides Downlink Interval Usage Code (DIUC), which is an interval usage code including the information of modulation and coding scheme for identifying a particular burst profile used by a downlink transmission interval, and Boosting for a given burst, and the Next MBS frame offset and the Next MBS OFDMA Symbol offset for determining the location of the next MBS frame. When receiving an MBS frame, the SS locates the MBS_MAP message according to an MBS_MAP Information Element (MBS_MAP_IE) in a Downlink (DL_MAP) message, and then the SS can determine the physical channel resources and DIUC parameter for this service. So the SS is capable to know the start transmission point, occupied subchannel(s) and occupied OFDMA symbol(s) inside the MBS ZONE.

FIG. 1 is a signal diagram illustrating a connection creation procedure for an MBS service of the prior art. The CID allocation 100 includes: an SS transmits a DSA_REQ (Dynamic Service Addition Request) message to the BS to set up an MBS connection in step 101; in step 102, the BS transmits to the SS a DSX_RVD (Dynamic Service X Received) message, which is normally used to inform the SS that the BS receives a DSA-related message such as the DSA_REQ message and will handle the received message; in the step 103, the BS transmits a DSA_RSP (Dynamic Service Addition Response) message that contains the information responsive to the DSA_REQ message; upon receiving the DSA_RSP message, in the step 104, the SS transmits a DSA_ACK (Dynamic Service Addition Acknowledge) message. In the course of one connection creation procedure, a Connection Identifier (CID) that uniquely identifies the MBS service connection is allocated.

Efficient and reliable delivery of video data is becoming increasingly important especially in wireless communication environment. Layered coding is a family of data representation techniques where the source data is partitioned into multiple layers. The layers are organized normally in a way that the lowest layer also called as base layer contains the minimum information for intelligibility; the other layers also called as enhancement layers contain additional information that incrementally improves the overall quality of the source data. When the layered coding technique is applied into video codec, the video data is normally encoded into multiple layers including a base layer of comparatively low quality video and at least one enhancement layer of increasingly higher quality video. On the receiver side in a layered coding communication system, a decoder can be configured to choose and decode a particular subset of these layers to get a particular quality of the video according to its preference and decoding capability.

FIG. 2 is a diagram schematically illustrating an example of downlink frame structure of the prior art. As shown in the FIG. 2, the preamble region 201 is used for transmitting a synchronization signal, i.e., a preamble sequence, for acquiring mutual synchronization between a BS and an SS. The DL_MAP region 203 is used for transmitting a DL_MAP message, and includes an MBS_MAP information Element (MBS_MAP_IE) region when MBS is provided. The MBS_MAP_IE region includes information necessary for decoding an MBS field that is comprised of MBS_MAP region 205 and fields 207 to 217. The MBS_MAP region 205 is used for transmitting a MBS_MAP message that includes location information where an SS receiving an MBS service receives MBS data bursts, and information necessary for decoding the data bursts. Contents of fields 207 to 217 are conveyed on data bursts. In this example, two MBS services of each containing three layers are presented, i.e. MBS services of session 1 and session 2, and each MBS service is provided with a base layer and two enhancement layers. When an SS receives an MBS service, the SS will decode at least one layer according to its decoding capability and preference.

However, there are some drawbacks. Assuming an SS intends to watch the MBS service of Session 1 and it has capability to decode all layers associated with the Session 1, thus, in order to receive all the data, the SS needs to perform 3 times the CID allocation procedure 100 in order to obtain CIDs for layers of SESSION1_BASE, SESSION1_ENHANCEMENT1, and SESSION1_ENHANCEMENT2. Thus, it is desirable to reduce the number of message exchange when obtaining CIDs of all layers for an MBS service.

SUMMARY

According to a general aspect of present invention, a method for providing a service in a communication network, wherein a plurality of layers are used to carry the service and each of the plurality of layers is associated with a unique identifier, the method comprises the steps of receiving a request message for said service; in response to the request message, sending a response message, wherein, the response message comprises information for determining the identifiers of the plurality of layers; and sending the service in the plurality of layers.

According to an aspect of present invention, a method for receiving a service in a communication network, wherein a plurality of layers are used to carry the service and each of the plurality of layers is associated with a unique identifier, it comprises the steps of sending a request message for the service; receiving a response message comprising information that can be used to determine the identifiers of the plurality of layers; determining identifiers of the plurality of layers based on the information in said response message; and receiving said service by using the identifiers of the plurality of layers.

According to an aspect of present invention, a signal for providing a service in a communication network, wherein a plurality of layers are used to carry the service and each of the plurality of layers is associated with a unique identifier, the signal includes a layer number value indicating the number of the plurality of layers and a single identifier of one of the plurality of layers, wherein, the layer number value and the single identifier are used to determination of the identifiers of the plurality of layers.

According to an aspect of present invention, a device for providing a service in a communication network, wherein a plurality of layers are used to carry the service and each of the plurality of layers is associated with a unique identifier, the device comprises a receiving module 501 configured to receive messages; and a message processing module 503 configured to generate a response message comprising information allowing the receiver based on this information to determine the identifiers of the plurality of layers for said service after the receiving module 501 receives a message requesting the service.

According to an aspect of present invention, a device for receiving a service in a communication network, wherein a plurality of layers are used to carry the service and each of the plurality of layers is associated with a unique identifier, the device comprises a receiving module 601 configured to receive messages; and an identifier determining module 603 configured to determine identifiers of the plurality of layers based on a response message received by the receiving module 601, wherein the response message comprising information for determining the identifiers of the plurality of layers.

As can be seen from the above, a single message contains necessary information to derive all identifiers for several layers within a single service. The information can either contain the identifiers in an explicit way, or comprise parameters to allow a receiving device to determine these identifiers with the proper algorithm.

According to an aspect of present invention, it reduces the number of messages exchanged when layered coding is employed due to that identifiers of all layers associated with a service can be determined base on the response message.

It is to be understood that both the foregoing general description and the following detailed description of the present invention are explanatory and exemplary only.

BRIEF DESCRIPTION OF THE DRAWINGS

The accompanying drawings, which are included to provide a further understanding of the invention and are incorporated in and constitute a part of this application, illustrate embodiment(s) of the invention together with the description which serves to explain the principle of the invention. Therefore, the invention is not limited to the embodiments. In the drawings:

FIG. 2 is a diagram schematically illustrating an example of downlink frame structure of the prior art.

DETAILED DESCRIPTION

The embodiment of the present invention will now be described in detail in conjunction with drawings. In the following description, some detailed descriptions of known functions and configurations may be omitted for clarity and conciseness.

The embodiment is elaborated in wireless network employing a layered coding technique. For an example, the documents IEEE Std 802.16e™-2005 and IEEE Std 802.16™-2004/Cor1-2005 (Amendment and Corrigendum to IEEE Std 802.16-2004), available from IEEE, 3 Park Avenue New York, N.Y. 10016-5997, USA and published on 28 Feb. 2006 define certain aspects of a wireless network. The embodiment described herein is placed in the frame of a network based on these documents, along with the changes indicated in the description. However, the invention should not be limited to the described network.

In the 802.16-based communication system, a new type-length-value field named "Number of layers" is added. The "Number of layers" field is used in the DSA-RSP/DSD-RSP (Dynamic Service Deletion Request) message to inform SS how many layers will be used for an MBS service.

Table 1 below gives one example of the "Number of layers" Field.

TABLE 1

One Example of Definition on "Number of Layers" Field

| Type | Name | Length (Byte) | Value | Scope |
|---|---|---|---|---|
| 47 | Layer Number | 1 | 1-4 - How many layers are used for an MBS service | DSA-REQ/RSP DSD-REQ/RSP |

Figure 1:
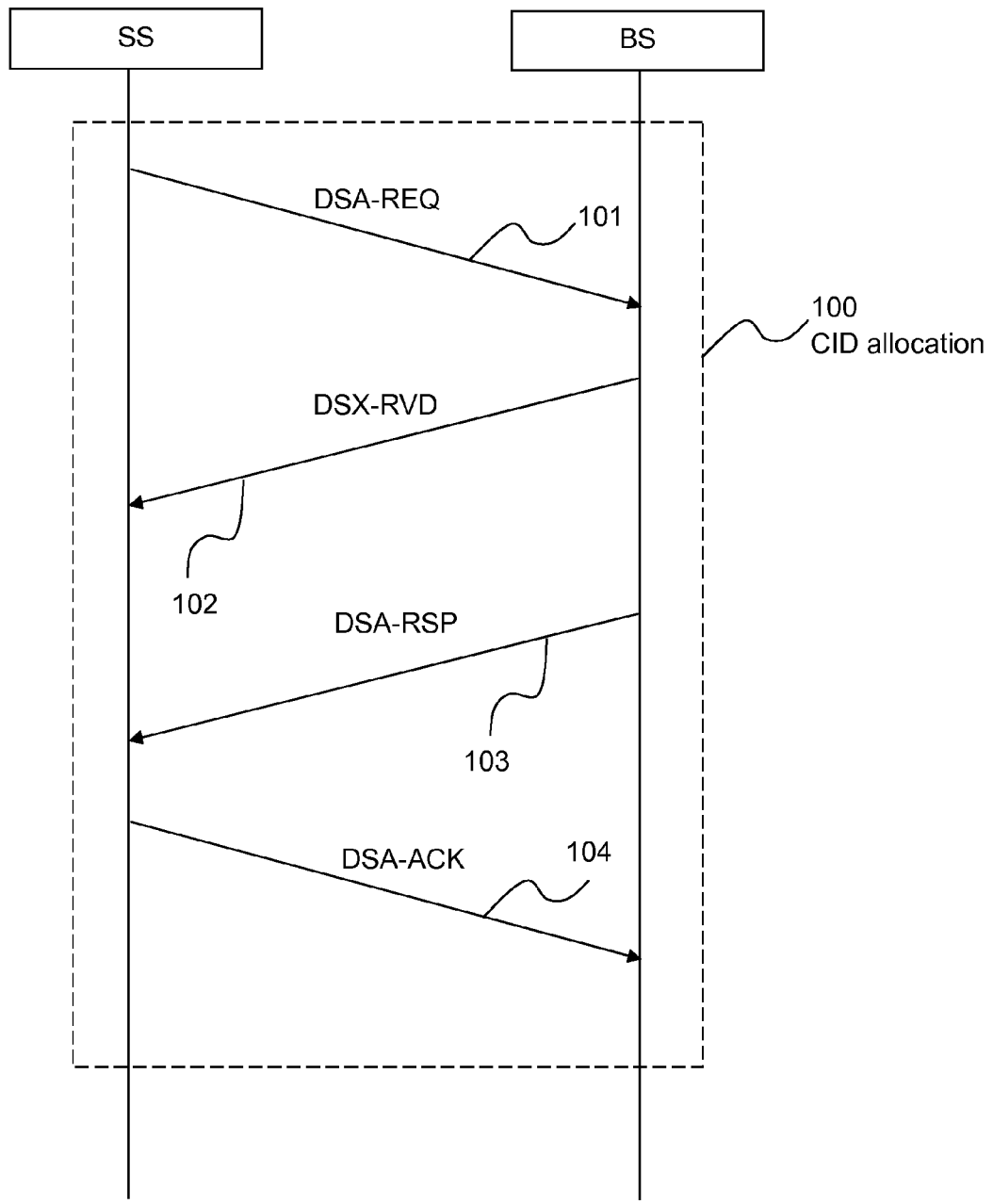
FIG. 1 is a signal diagram illustrating a connection creation procedure for an MBS service of the prior art.
Figure 3:
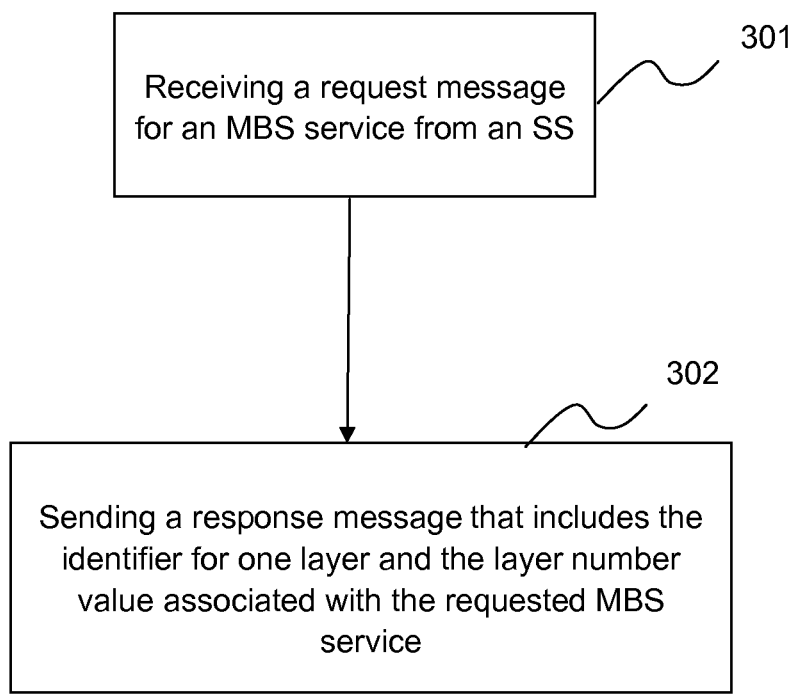
FIG. 3 is a flow chart diagram illustrating a detailed method carried out by a BS according to one embodiment of the present invention.

As shown in FIG. 3 a flow chart diagram illustrating a method for providing a layered coding service carried out by the BS according to the embodiment of the present invention.

In step 301, a BS receives a request message for an MBS service from an SS. As an example, the request message for the MBS service is contained in the DSA-REQ message.

Note that the content of MBS service should not be limited to the multimedia, such as video, audio and etc. It can, as an example, include comparatively low bit-rate message services, such as text, and can also include the mixture of low bit-rate message service and high bit-rate multimedia service. Typically, the message service is encoded into the base layer.

Furthermore, according to a variant of the present embodiment, the request message is not received from an SS, but received from a trigger event or a command from an application. One example of the trigger event is the time reaches a predefined time value.

According to the present embodiment, the method further comprises the step that the BS determines whether or not the MBS service requested by the SS employs layered coding. Because the information about whether or not the MBS service employs layered coding is predefined in the BS, the BS can acquire such information by looking up a predefined fixed table or receiving message from an application that can provide such information. Note that this step would be redundant if all MBS services always employ the layered coding technique. If employing a layered coding, the BS derives the layer number value indicating the number of layers for the requested MBS service, and determines identifiers of all layers associated with the requested MBS service based on the layer number value. As an example, the BS acquires the layer number value associated with the requested MBS service from a predefined fixed table stored in the BS, and then the BS chooses the identifier of one layer associated with the MBS service from CID address space. Identifiers of the other layers associated with the same requested MBS service are allocated by using an algorithm based on the identifier of one layer and the layer number value. Herein, one simple example of the algorithm is to use consecutive number values by incrementing the initial value. Assuming the layer number value is 3 and the identifier of one layer associated with the MBS service from CID address space is K, then the CID of base layer is K, and the CIDs for the other two layers are K+1 and K+2 respectively.

After the BS determines the information about the layer number value and identifiers of all layers associated with the requested MBS service, the BS will choose one identifier to be included in the response message. As an example, the CID of base layer will be used as the chosen identifier to be included in the response message. Besides, the response message will also contain the information about the layer number value. Therefore, the SS can calculate identifiers of all layers associated with the requested MBS service based on the response message as long as that the SS uses the same algorithm as used by the BS, or an algorithm giving the same results.

In step 302, in response to the request message, the BS sends to the SS a response message that includes the chosen identifier for one layer and the layer number value associated with the requested MBS service. As an example, the information about the identifier of one layer and the layer number value is organized in the manner as shown in table 2.

TABLE 2 an Example of Modified MBS_DATA_IE

| Syntax | Size | Notes |
|---|---|---|
| MBS_DATA_IE{ | | |
| MBS_MAP Type =0 | 2 bits | MBS_DATA_IE |
| MBS_Burst Frame Offset | 2 bits | The burst located by this IE will be shown after offset+2 frames |
| Next MBS MAP change indication | 1 bit | Whether the size of MBS MAP message of next MBS frame include this IE is changed |
| (1) Layer coding indication | 1 bit | Whether the layered coding is employed |
| If (layer coding indication = 1){ | | |
| (2) Multicast CID base | 12 bits | 12 Lease Significant Bit of CID for the base layer |
| (3) No. of coding layer | 2 bits | How many layers are employed |
| For(i=0; i<No. of layer; i++){ | | |
| (4) MBS DIUC | 4 bits | |
| (4) OFDMA Symbol Offset | 8 bits | OFDMA symbol offset |
| (4) Subchannel Offset | 6 bits | OFDMA subchannel offset |
| } | | |
| } | | |
| ... | 42 bits | Other field in MBS_DATA_IE |

Table 2 shows an example of a portion of the MBS_DATA_IE as modified according to the present embodiment and that is included in the MBS_MAP. Compared with MBS_DATA_IE defined in IEEE 802.16 standard, the modified MBS_DATA_IE makes the following modifications:

(1) Adding a "layer coding indication" field, a 1 bit field indicating whether the layered coding is employed or not.

If layered coding is employed, the MBS_DATA_IE further includes:

(2) Adding a "multicast CID base" field, a 12-bit field containing the an identifier value for determining identifiers of all layers for the requested layered coding MBS service;

(3) Changing the existing "No. of Multicast CID" field in the current IEEE 802.16 standard to "No. of coding layer" field, a 2-bit field indicating how many layers are employed for the requested layered coding MBS service; and (4) Adding a "parameters" field for each layer of an MBS service, i.e. MBS_DIUC, OFDMA Symbol Offset and Subchannel Offset. MBS_DIUC is a 4-bit field indicating the DIUC for one layer of an MBS service.

Herein, as an example, the "multicast CID base" field comprises the chosen identifier, which typically is the identifier of the base layer for the requested layered coding MBS service, and the "No. of coding layer" field contains the layer number value. Supposing the value of multicast CID base is 0b101010110000 and the value for No. of coding layer is 3, and the algorithm is using consecutive values in number, thus, the CID for enhancement layer 1 is 0b101010110001, and the CID for enhancement layer 2 is 0b101010110010. It should be noted that other algorithms can be used as long as the BS and the SS can determine the same identifiers of all layers.

Figure 4:
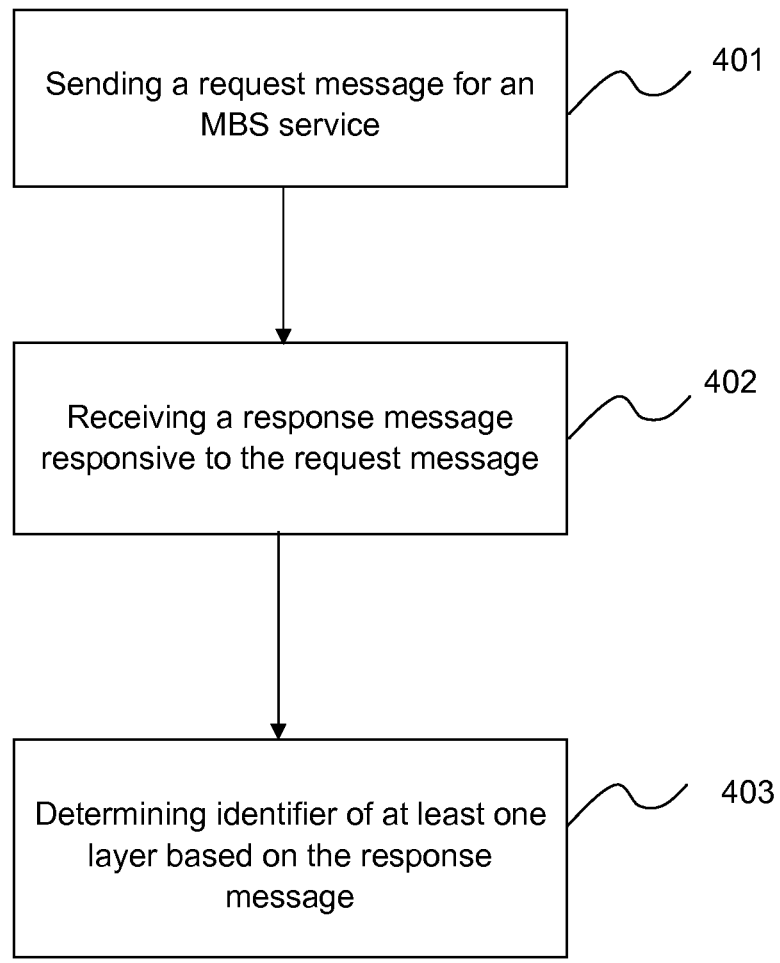
FIG. 4 is a flow chart diagram illustrating a detailed method carried out by an SS according to the embodiment of the present invention.

FIG. 4 is a flow chart diagram illustrating a method for receiving layered coding service carried out by the SS according to one embodiment of the invention.

In step 401, an SS sends to a BS a request message for an MBS service. As an example, the request message is contained in DSA-REQ;

In step 402, the SS receives from the BS a response message responsive to the request message. As an example, the response message is DSA-RSP. The response message mainly includes the information for determining identifiers of all layers associated with the requested MBS service. As an example, the information comprises an identifier for one layer and the layer number value associated with the requested MBS service if layer coding is employed. If the modified MBS_DATA_IE as shown in table 2 is used in the response message, the SS could acknowledge whether the layered coding is employed by checking the "layered coding indication" field of the modified MBS_DATA_IE. After the SS determines identifiers of all layers, it will allocate identifiers of all layers.

According to a variant of the present embodiment, the "layered coding indication" field and the step of checking whether layered coding is employed are redundant if all MBS services employ layered coding.

According to a variant of the present embodiment, the step of allocating identifiers of all layers associated with the requested MBS service is redundant if identifiers are pre-allocated.

In step 403, the SS determines the identifier of at least one layer for the requested MBS service based on the response message. That is, when employing layered coding, at least two identifiers are determined by the SS, and when not employing layered coding, only one identifier is determined normally. As an example, when using the modified MBS_DATA_IE, the SS firstly extract the values of "multicast CID base" field and "No. of coding layer" field from the response message, and then calculate identifiers of all layers by using the same algorithm as used or a similar algorithm giving the same result by the BS. After the SS gets identifiers of all layers for the requested MBS service, the SS will use the identifiers to receive MBS data from BS. Moreover, since the modified MBS_DATA_IE contains the information about the DIUC, OFDMA Symbol Offset and Subchannel Offset for each identifier that uniquely identifies one layer, the SS can acknowledge the exact time slot that layers for the requested MBS service occupied. Therefore, the SS need not be active during the time slot occupied by layers for MBS services not requested.

It can be seen from the above description, messages exchanged in the procedure of DSA and DSD will be reduced, i.e. when an SS want to receive a layered coding MBS service, only one time DSA message exchange procedure is performed. Furthermore, because each layer of an MBS service has its own unique identifier and each identifier is associated with DIUC, OFDMA Symbol Offset and subchannel Offset, the SS can exactly know which part of data is belonging to its requested MBS service, and skip the data block for other MBS services. Therefore, power of the SS can be saved According to one aspect of the invention, a signal for providing multicast and broadcast service that employs layered coding in a communication network is provided. The signal comprising information for determining identifiers of all layer for an MBS service requested by an SS. As an example, the information in the signal includes a layer number value indicating the number of layers associated with the requested MBS service and an identifier of one of the layers, wherein, the layer number value and the identifier of one of the layers is used to determine identifiers of all the layers associated with the requested MBS service.

There are alternatives. In one variant of the present embodiment, the number of layers is a constant, e.g. 3. Therefore, it is needless to include the information about number of layer in the response message.

In one variant of the present embodiment, the value in "multicast CID base" field is not an identifier of one layer, but is other information that can be used to derive the identifiers, e.g. a pointer to a table that contains identifiers or an encoded value of an identifier.

In one variant of the present embodiment, the response message received by the SS does not contain the identifier of one layer and the number of layers, but a single value instead, as long as the SS can determine all identifiers of layers based on that value. One simple example of generating such a value is that combining all identifiers' value into one value by appending one identifier value to the next (e.g. A and B are layer identifiers, then the combined value is AB, having double length compared to a single identifier), or a pointer to a group of identifiers stored in a storage device. Furthermore, identifiers may also be listed in different fields, as long as identifiers for all layers of an MBS service are sent in response to the request message.

Figure 5:
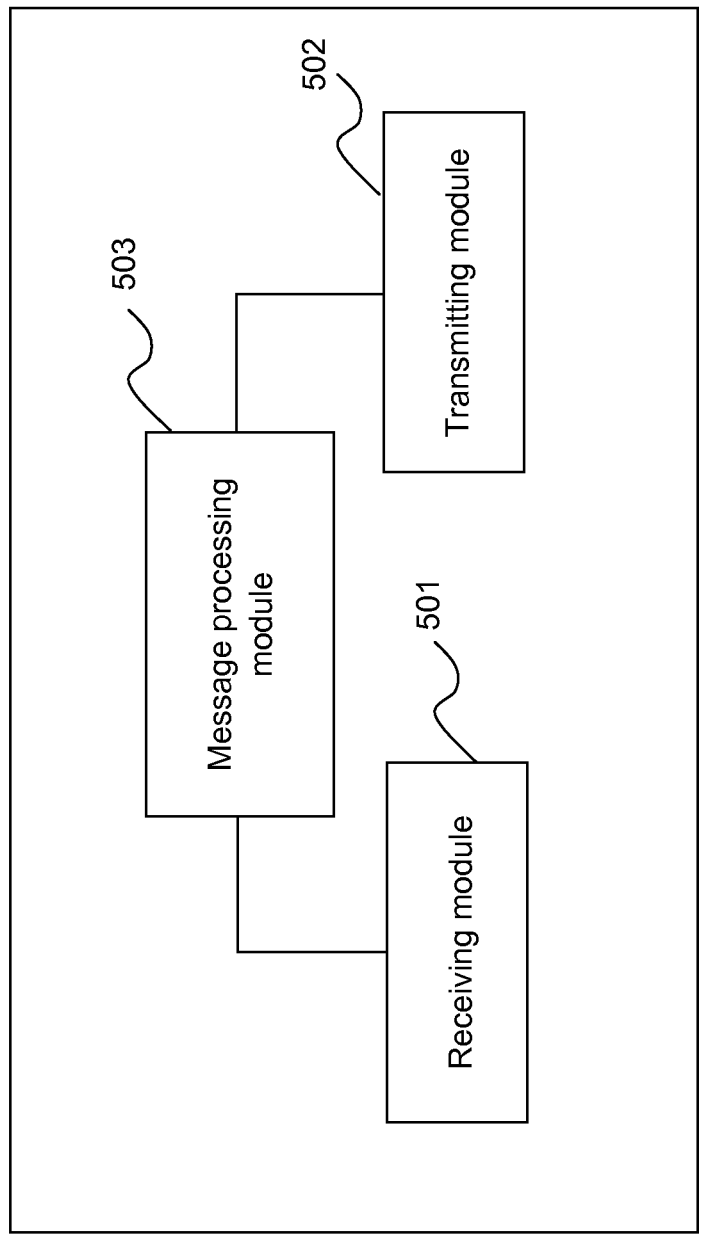
FIG. 5 is a block diagram of the BS according to the embodiment of the present invention.

FIG. 5 is block diagram of the BS according to the present embodiment of the invention. The BS 500 comprises a receiving module 501, a transmitting module 502 and a message processing module 503. The receiving module 501 is configured to receive messages comprising a request message for an MBS service. The transmitting module 502 is configured to transmit messages comprising a response message responsive to a request message. The message processing module 503 is configured to generate a response message comprising information for determining identifiers of all layers associated with the requested MBS service in response to a request message received by the receiving module 501, and send the response message through the transmitting module 502. Furthermore, the BS comprises a layer coding mode determining module (not shown in the diagram) and an identifier allocating module (not shown in the diagram). The layer coding mode determining module is configured to determine whether or not the MBS service requested by the SS employs layered coding, and invoke the message processing module 503 to generate a response message if the MBS service employs layered coding. Typically the layer coding mode determining module acquires the information about whether or not the MBS service employs layered coding from a pre-defined table stored in a storage device. The identifier allocating module is configured to allocating identifiers of all layers associated with an MBS service. Normally, when a BS receives a request message for an MBS service, it will invoke the identifier allocating module to allocate identifiers of all layers associated with the requested MBS service before transmitting data of the requested MBS service.

According to a variant of the present embodiment, the layer coding mode determining module of the BS is redundant if all MBS services employ layered coding.

According to a variant of the present embodiment, the identifier allocating module of the BS is redundant if identifiers of all layers associated with requested MBS service are prefixed.

Figure 6:
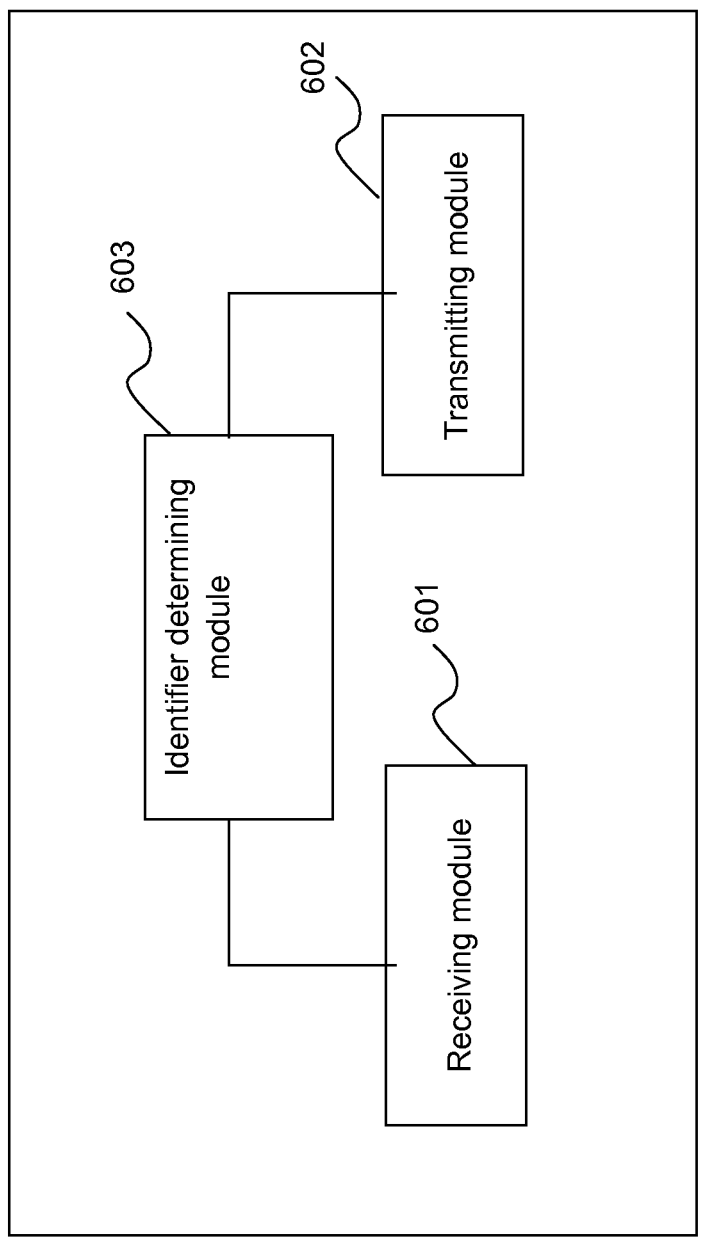
FIG. 6 is a block diagram of the SS according to the embodiment of the present invention.

FIG. 6 is a block diagram of the SS according to the embodiment of the present invention. The SS 600 comprises a receiving module 601, a transmitting module 602 and an identifier determining module 603. The transmitting module 602 is configured to transmit messages comprising a request message for an MBS service. The receiving module 601 is configured to receive messages, which comprises a response message from the BS responsive to a request message sent by the transmitting module 602. The identifier determining module 603 is configured to determine identifiers of all layers associated with an MBS service based on the response message received by the receiving module 601. Furthermore, the SS comprises a layer coding mode determining module (not shown in the diagram) and an identifier allocating module (not shown in the diagram). The layer coding mode determining module is configured to determine whether or not layered coding is employed based on the response message. The identifier allocating module is configured to allocating identifiers of all layers associated with an MBS service. Normally, when an SS determines identifiers of all layers associated with the requested MBS service, it will invoke the identifier allocating module to allocate the identifiers of all layers before receiving data of the requested MBS service.

According to a variant of the present embodiment, the layer coding mode determining module is redundant if all MBS services employ layered coding.

According to a variant of the present embodiment, the identifier allocating module of the BS is redundant if identifiers of all layers associated with requested MBS service are prefixed.

A number of implementations have been described. Nevertheless, it will be understood that various modifications may be made. For example, elements of different implementations may be combined, supplemented, modified, or removed to produce other implementations. Additionally, one of ordinary skill will understand that other structures and processes may be substituted for those disclosed and the resulting implementations will perform at least substantially the same function(s), in at least substantially the same way(s), to achieve at least substantially the same result(s) as the implementations disclosed. Accordingly, these and other implementations are contemplated by this application and are within the scope of the invention.

What is claimed is:

1. A method for providing services in a communication network, wherein, at a side of a service providing device, comprising steps of receiving a request message for a service, data of which is encoded into a plurality of layers by using layer coding;

in response to said request message, sending a response message, wherein, said response message comprises a single connection identifier corresponding to one layer among the plurality of layers and a number of the plurality of layers for determining connection identifiers for said plurality of layers, wherein, each connection identifier uniquely identifies a service connection, and each layer of the plurality of layers corresponds to a service connection for transmitting its data; and sending data of said plurality of layers of said service through service connections identified by connection identifiers determined from the single connection identifier corresponding to one layer among the plurality of layers and the number of the plurality of layers wherein, an individual modulation and coding scheme corresponds to each of said plurality of layers and said plurality of layers contain a base layer containing minimum information for intelligibility and at least one enhancement layer containing additional information that incrementally improves overall quality of the service.

2. Method according to claim 1, wherein, information in said response message comprises a list of connection identifiers for said plurality of layers.

3. Method according to claim 1, wherein, said single connection identifier is chosen among the connection identifiers for said plurality of layers in a way the other connection identifiers for said plurality of layers can be determined based on said chosen identifier and the number of layers by a receiver of said response message.

4. A method for receiving services in a communication network, wherein, at a side of a service requesting device, comprising steps of sending a request message for a service, data of which is encoded into a plurality of layers by using layer coding;

receiving a response message comprising a single connection identifier corresponding to one layer among the plurality of layers and a number of the plurality of layers used to determine connection identifiers for said plurality of layers, wherein, each identifier uniquely identifies a service connection, and each layer of the plurality of layers corresponds to a service connection for transmitting its data;

receiving data of said plurality of layers of said service through service connections identified by connection identifiers determined from the single connection identifier corresponding to one layer among the plurality of layers and the number of the plurality of layers, wherein, an individual modulation and coding scheme corresponds to each of said plurality of layers and said plurality of layers contain a base layer containing minimum information for intelligibility and at least one enhancement layer containing additional information that incrementally improves overall quality of the service.

5. A device for providing services in a communication network, wherein, the device comprises, a receiving module which receives request messages for services, wherein, data of some services is encoded into a plurality of layers by using layer coding, a message processing module which generates a response message comprising a single connection identifier of one layer among the plurality of layers and a number of the plurality of layers allowing a receiver to determine connection identifiers for said plurality of layers of a service after said receiving module receives a message requesting said service, wherein, each identifier uniquely identifies a service connection, and each layer of the plurality of layers corresponds to a service connection for transmitting its data;

a transmitting module which sends data of said plurality of layers of said service through service connections identified by connection identifiers determined from the single connection identifier corresponding to one layer among the plurality of layers and the number of the plurality of layers, wherein, an individual modulation and coding scheme corresponds to each of said plurality of layers and said plurality of layers contain a base layer containing minimum information for intelligibility and at least one enhancement layer containing additional information that incrementally improves overall quality of the service.

6. A device for receiving services in a communication network, wherein, the device comprises:

a receiving module which receives messages, and an identifier determining module which determines connection identifiers for said plurality of layers based on a response message received by said receiving module, wherein said response message comprises a single connection identifier of one layer among the plurality of layers and a number of the plurality of layers for determining the connection identifiers for said plurality of layers, each connection identifier uniquely identifies a service connection, and each layer of the plurality of layers corresponds to a service connection for transmitting its said receiving module receiving data of said plurality of layers of said service through service connections identified by connection identifiers determined from the single connection identifier corresponding to one layer among the plurality of layers and the number of the plurality of layers, wherein, an individual modulation and coding scheme corresponds to each of said plurality of layers and said plurality of layers contain a base layer containing minimum information for intelligibility and at least one enhancement layer containing additional information that incrementally improves overall quality of the service.

\* \* \* \* \*